United States Patent Office 3,400,884
Patented Sept. 10, 1968

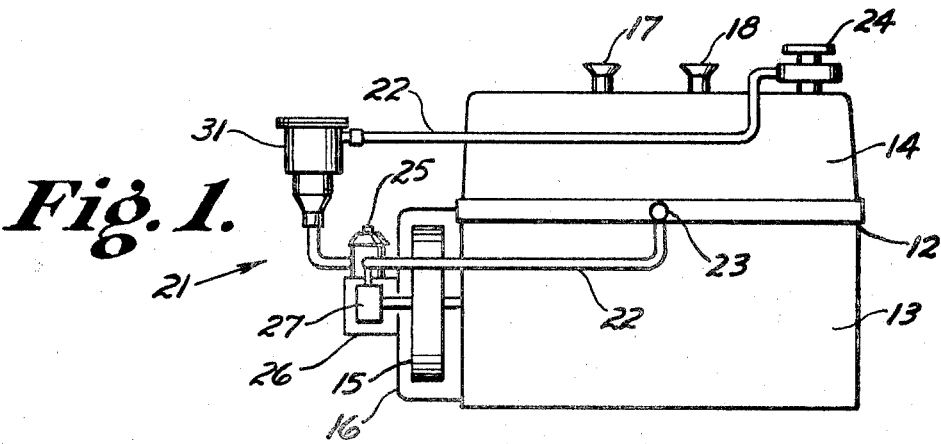
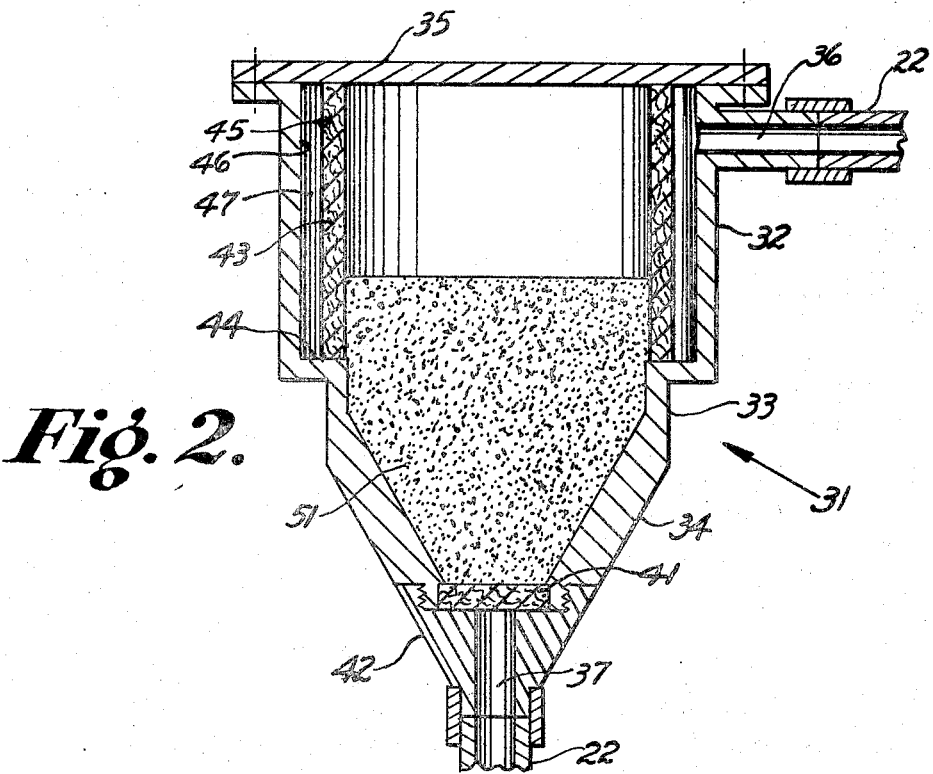

3,400,884
VACUUM PUMP ADSORBENT FILTER
APPARATUS
Peter Hundenborn, Cologne-Bickendorf, and Klaus
Kutzke, Cologne-Ostheim, Germany, assignors to
Leybold Holding AG, Zug, Switzerland, a Swiss
joint-stock company
Filed May 31, 1966, Ser. No. 559,664
Claims priority, application Germany, Aug. 23, 1965,
L 51,450
12 Claims. (Cl. 230—206)

ABSTRACT OF THE DISCLOSURE

The oil filter casing includes an upper cylindrical portion and a lower conical portion which extends downwardly tapering to an inlet port at its lower apex. An outlet port opens from the upper cylindrical wall adjacent to the top; and a sleeve-like outlet filter element defines with the cylindrical wall an annular free space which communicates with the outlet port. An inlet filter element is positioned at the bottom of the conical portion adjacent to the inlet port to intercept all of the oil flowing into the casing. The casing is partially filled with adsorbent clay particles through which the oil is percolated.

---

This invention relates to an adsorbent filter for continuous filtering of circulating oil and especially to such a device for use with mechanical vacuum pumps.

Conventional mechanical vacuum pumps utilize suitable oils as both a gas seal and as a lubricant for the pump's moving parts. During operation under certain conditions, the oil can become contaminated by mixture with gases, fluids or solids contained in the medium being pumped. This is particularly undesirable in vacuum pumps because in addition to causing increased wear of moving parts the contamination normally has a higher vapor pressure than the pump oil itself and accordingly can reduce the ultimate vacuum obtainable with the pump.

Known methods for alleviating this problem include periodic removal of the oil from the pump for subjection to various types of chemical or physical purification processes. After treatment the oil is returned to the pump for further use. The obvious disadvantages of this particular method are the requirement for discontinuation of pump operation during the oil transfer and the relatively high labor costs involved. Furthermore, a certain degree of contamination build-up must be tolerated prior to the removal of the oil from processing.

Also known are mechanical type filters positioned in an oil circulation path for continuous filtration of the oil during pump operation. While such filters eliminate some of the above noted problems and are also somewhat effective in removing certain solid content from the pump oil, they have been found generally unsatisfactory for use with vacuum pumps. Their inadequacy results primarily from an inability to remove all of the high vapor pressure contamination mixed with the pump oil and which, as noted above, can substantially reduce the ultimate vacuum obtainable with the pump.

The object of this invention, therefore, is to provide a filter apparatus for mechanical vacuum pumps which will allow continuous processing of the pump oil for removal of substantially all high vapor pressure components as well as mechanically harmful solid materials.

One feature of this invention is the provision of an oil filter device containing a volume of adsorbent clay particles adapted to continuously purify oil circulating between inlet and outlet openings in the filter casing.

Another feature of this invention is the provision of a filter device of the above featured type positioned in an oil circulation system adapted to continuously circulate and purify the oil contained in the oil reservoir of a mechanical vacuum pump.

Another feature of this invention is the provision of an oil filter device of the above featured type wherein the inlet opening is positioned in the lower portion of the filter casing and the outlet opening in the upper portion thereof and including porous inlet and outlet filter elements positioned so as to intercept and transmit all oil flow through the filter device. This arrangement substantially eleminates the flow of adsorbent clay particles out of the filter device and into contact with the moving parts of the mechanical pump.

Another feature of this invention is the provision of a filter device of the above featured type wherein the inner volume of the filter casing which retains the adsorbent filter particles has an increasing cross-sectional area in the direction from the filter inlet to the filter outlet. This arrangement produces within the filter device a gradual reduction in the flow velocity of the circulating oil and thereby tends to reduce movement of the clay particles toward the outlet opening of the filter device.

Another feature of this invention is the provision of a filter device of the above featured type wherein the inner surface of the filter casing retaining the adsorbent clay particles has an inverted conical shape.

Another feature of this invention is the provision of a filter device of the above featured types wherein the porous outlet filter element has a hollow cylindrical shape with an outer surface spaced from the inner surface of the filter casing to form therebetween a free volume communicating with the filter outlet and isolated from the filter inlet. This free volume reduces pressure differential across the outlet filter element and accordingly reduces the possibility of clay particle movement therethrough.

These and other objects and features of the instant invention will become more apparent upon a perusal of the following specification taken in conjunction with the accompanying drawings wherein:

FIG. 1 is a schematic view of a mechanical vacuum pump apparatus according to the present invention; and FIG. 2 is a detailed cross-sectional view of the filter device shown in FIG. 1.

Referring to FIG. 1, there is shown the mechanical vacuum pump 11 having the pump housing 12 which encloses a pumping element section 13 and an oil reservoir 14. Driving the pumping elements (not shown) within the pump section 13 is the drive pulley 15 which is enclosed by the beltguard 16. The drive pulley 15 is in turn belt-driven by a suitable motor (not shown). Projecting through the top wall of the pump casing 12 are the inlet tubulation 17 adapted for connection with a system to be evacuated and the exhaust tubulation 18 through which the pumped gases are discharged.

The oil circulation system 21 includes the oil lines 22 which are series connected between the oil drain valve 23 in the lower portion of the oil reservoir 14 and the oil filling valve 24 located in the upper portion thereof. Positioned in series with the oil lines 22 is the fluid pump 25 which is supported by a bracket 26 and is driven by the drive pulley 15 via the connected drive cam 27. Also series connected in the oil lines 22 is the filter device 31 which is shown in greater detail in FIG. 2.

The filter device 31 has a filter casing composed of an upper hollow cylindrical portion 32, a hollow cylindrical mid-portion 33 of smaller diameter than the upper portion 32, and an inverted conically shaped hollow lower portion 34. Closing the upper end of the upper casing portion 32 is a removable circular plate 35. The outlet opening 36 is formed by an aperture in the upper end of the upper filter casing 32 and communicates with the oil tubulation 22. Located at the downwardly directed apex of the conically shaped lower portiion 34 is the inlet opening 37 which also communicates with an oil tubulation 22.

Positioned in the inlet opening 37 is the porous inlet filter element 41 which can be replaced by removal of the threaded filter end cap 42. The inlet filter element 41 can be, for example, a synthetic foam disc having suitable filtration properties. The hollow cylindrical outlet filter element 43 is positioned within the upper filter casing portion 32 and can be replaced by removal of the cover 35. The outlet filter element 43 can also, for example, be made of a synthetic foam material having suitable filtration properties. In addition, for structural stability the inner and outer walls of the outlet filter element 43 can be formed by, for example, wire screens. Supporting the filter 43 is the annular inner shoulder 44 which joins the upper casing portion 32 and the middle casing portion 33. The outer surface 45 of the outlet filter element 43 is spaced from the inner surface 46 of the upper casing portion 32 forming the free annular space 47 which communicates directly with the outlet opening 36 but is isolated from the inlet opening 37 by the inner volume of the filter device and by the outlet filter element 43. Retained by the inner surfaces of the filter device 31 is a volume of adsorbent clay particles 51. Materials such as fuller's earth, bentonite, bauxite and alumina, and activated alumina can be used as an adsorbent.

During operation of the invention, pump oil in the reservoir 14 will be circulated out of the oil drain valve 23 and back into the oil fill valve 24 by the fluid pump 25. During circulation the oil passes through the porous inlet filter element 41 and into percolation contact with the adsorbent clay material 51. Upon contact the clay particles adsorb undesirable asphaltic and resinous materials which have become mixed with the oil in the pump 11. This "bleaching" or "discoloration" of the oil greatly improves it vacuum properties. After neutralization by the clay particles the oil passes through the outlet filter element 43, which prevents transgression of the clay particles and returns to the pump for further use.

The unique filter device 31 is particularly suited for this application. After passing through the inlet opening 37 the flow velocity of the oil is gradually reduced because of the increasing cross-sectional area provided by the conically shaped lower filter portion 34. Because of the reducing flow velocity the clay particles 51 initially rise with the oil in the center of the filter and then return toward the bottom of the filter along the inner surfaces thereof in a mushroom-shaped path. In addition to producing an excellent mixing of the oil and clay particles, this movement reduces the number of clay particles which are carried by the flowing oil against the inner surface of the outlet filter element 43. Accordingly, clogging or penetration of the outlet filter element 43 by the clay particles is reduced.

In a practical embodiment of the invention, the filter 31 was connected with a medium capacity mechanical vacuum pump and filled with adsorbent (Tonsil) having a grain size of 60–90 microns. About 75 cubic centimeters of adsorbent was used for each liter of pump oil. With a pressure of 0.1 atmosphere gauge at the filter inlet, an oil flow rate through the filter of 140 cubic centimeters per minute was obtained. After a few hours of circulation, a substantial cleansing of the pump oil was observed.

Obviously, many modifications and variations of the present invention are possible in light of the above teachings. It is, therefore, to be understood that within the scope of the appended claims the invention may be practiced otherwise than as specifically described.

What is claimed is:
1. A mechanical vacuum pump apparatus comprising:
a pump housing which defines an oil reservoir; an oil circulation system adapted to circulate oil out of and into said oil reservoir; pump means for producing circulation of oil through said oil circulation system; an oil filter device positioned in said oil circulation system and adapted to filter oil circulating therethrough;
said oil filter device including a filter casing defining an inlet opening in the lower end thereof and an outlet opening at the upper portion thereof; said casing defining a chamber having a relatively small cross sectional area at its lower end, adjacent said inlet opening, and increasing in cross sectional area upward from said inlet opening, whereby the flow velocity of oil is reduced as it flows upward from said inlet opening;
an inlet filter element positioned to intercept and transmit all of the oil flow through said inlet opening; an outlet filter element positioned to intercept and transmit all of the oil flow through said outlet opening; and a volume of adsorbent clay particles retained within said filter casing, whereby the oil passing through said filter device percolates through said particles.

2. An oil filter device according to claim 1 wherein said inner surface of said filter casing adjacent said inlet opening has an inverted conical shape.

3. An oil filter device as set forth in claim 1 wherein the upper portion of said chamber is generally uniform in cross section and merges with the lower portion of varying cross sectional area, and the volume of clay particles contained within said filter casing being sufficient to substantially fill the chamber portion of varying cross sectional area.

4. A mechanical vacuum pump apparatus comprising:
a pump housing which defines an oil reservoir; an oil circulation system adapted to circulate oil out of and into said oil reservoir; pump means for producing circulation of oil through said oil circulation system; an oil filter device positioned in said oil circulation system and adapted to filter oil circulating therethrough;
said oil filter device including a filter casing defining an inlet opening at the lower portion thereof and an outlet opening at the upper portion thereof; an inlet filter element positioned to intercept and transmit all of the oil flow through said inlet opening; a sleeve-like outlet filter element positioned to intercept and transmit all of the oil flow through said outlet opening; said outlet filter element being supported within said filter casing in a manner that the outer surface of the filter element is spaced from the inner surface of the casing, forming therebetween a free space communicating with said outlet opening and isolated from said inlet opening; and a volume of adsorbent clay particles retained within said filter casing whereby the oil passing through said filter device percolates through said particles.

5. An oil filter device according to claim 4 wherein the inner surface of said filter casing adjacent said inlet opening defines a chamber volume which has an increasing cross-sectional area in a direction from said inlet opening to said outlet opening and said chamber volume accommodates said volume of adsorbent clay particles.

6. An oil filter device according to calim 5 wherein said inner surface of said filter casing adjacent said inlet opening has an inverted conical shape.

7. An oil filter device comprising
a filter casing defining an inlet opening in the lower end thereof and an outlet opening at the upper portion thereof; said casing defining a chamber having a small cross sectional area at its lower end, adjacent said inlet opening, and increasing in cross sectional area upward from said inlet opening, whereby the flow velocity of oil is reduced as it flows upward from said inlet opening;
an inlet filter element positioned to intercept and transmit all of the oil flow through said inlet opening; an outlet filter element positioned to intercept and transmit all of the oil flow through said outlet opening; and a volume of adsorbent clay particles retained within said filter casing, whereby the oil passing through said filter device percolates through said particles.

8. An oil filter device according to claim 7 wherein said inner surface of said filter casing adjacent said inlet opening has an inverted conical shape.

9. An oil filter device as set forth in claim 7 wherein the upper portion of said chamber is generally uniform in cross section and merges with the lower portion of varying cross sectional area; and the volume of clay particles contained within said filter casing being sufficient to substantially fill the chamber portion of varying cross sectional area.

10. An oil filter device comprising
a filter casing defining an inlet opening at the lower portion thereof and an outlet opening at the upper portion thereof; an inlet filter element positioned to intercept and transmit all of the oil flow through said inlet opening; a sleeve-like outlet filter element positioned to intercept and transmit all of the oil flow through said outlet opening; said outlet filter element being supported within said filter casing in a manner that the outer surface of the filter element is spaced from the inner surface of the casing, forming therebetween a free space communicating with said outlet opening and isolated from said inlet opening; and a volume of adsorbent clay particles retained within said filter casing whereby the oil passing through said filter device percolates through said particles.

11. An oil filter device according to claim 10 wherein the inner surface of said filter casing adjacent said inlet opening defines a chamber volume which has an increasing cross-sectional area in a direction from said inlet opening to said outlet opening and said chamber volume accommodates said volume of adsorbent clay particles.

12. An oil filter device according to claim 11 wherein said inner surface of said filter casing adjacent said inlet opening has an inverted conical shape.

References Cited
UNITED STATES PATENTS

| | | | |
|---|---|---|---|
| 847,518 | 3/1907 | Shiltz | 210—289 |
| 1,570,890 | 1/1926 | Hall | 210—287 XR |
| 2,602,583 | 7/1952 | Haeberlein | 230—207 |

ROBERT M. WALKER, *Primary Examiner.*